(12) United States Patent
Shaikh et al.

(10) Patent No.: US 9,021,073 B2
(45) Date of Patent: Apr. 28, 2015

(54) IP POOL NAME LISTS

(75) Inventors: Imtiyaz Shaikh, Irving, TX (US); Xuming Chen, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1013 days.

(21) Appl. No.: 12/854,235

(22) Filed: Aug. 11, 2010

(65) Prior Publication Data

US 2012/0042058 A1    Feb. 16, 2012

(51) Int. Cl.
G06F 15/177    (2006.01)
H04L 12/24     (2006.01)
H04L 29/12     (2006.01)

(52) U.S. Cl.
CPC ...... *H04L 41/0806* (2013.01); *H04L 29/12188* (2013.01); *H04L 29/12245* (2013.01); *H04L 29/12283* (2013.01); *H04L 61/1588* (2013.01); *H04L 61/203* (2013.01); *H04L 61/2061* (2013.01)

(58) Field of Classification Search
None
See application file for complete search history.

(56) References Cited

U.S. PATENT DOCUMENTS

| | | | |
|---|---|---|---|
| 6,427,174 B1 * | 7/2002 | Sitaraman et al. | 709/245 |
| 6,539,461 B2 * | 3/2003 | Suzuki et al. | 711/162 |
| 7,558,863 B1 * | 7/2009 | Sitaraman et al. | 709/228 |
| 8,195,778 B1 * | 6/2012 | Leung et al. | 709/222 |
| 8,244,886 B2 * | 8/2012 | Short et al. | 709/228 |
| 2005/0152395 A1 * | 7/2005 | Hales | 370/465 |
| 2008/0101353 A1 * | 5/2008 | Streijl et al. | 370/389 |
| 2009/0006585 A1 * | 1/2009 | Chen | 709/220 |
| 2009/0061869 A1 * | 3/2009 | Bui et al. | 455/435.1 |
| 2011/0128913 A1 * | 6/2011 | Chowdhury et al. | 370/328 |

FOREIGN PATENT DOCUMENTS

| | | | |
|---|---|---|---|
| JP | 2002135303 A | * | 5/2002 |
| JP | 2004104800 A | * | 4/2004 |
| JP | 2011130194 A | * | 6/2011 |

* cited by examiner

*Primary Examiner* — Jeffrey R Swearingen

(57) ABSTRACT

A method including receiving a session request associated with a user equipment (UE); selecting one or more network address pool name lists based on a type of service to be provided to the UE; selecting one or more network address pool names from the one or more network address pool name lists based on a priority associated with the one or more network address pool names; selecting one or more network addresses from the one or more network address pool names; assigning the one or more network addresses to the UE; and establishing a session with the UE.

20 Claims, 14 Drawing Sheets

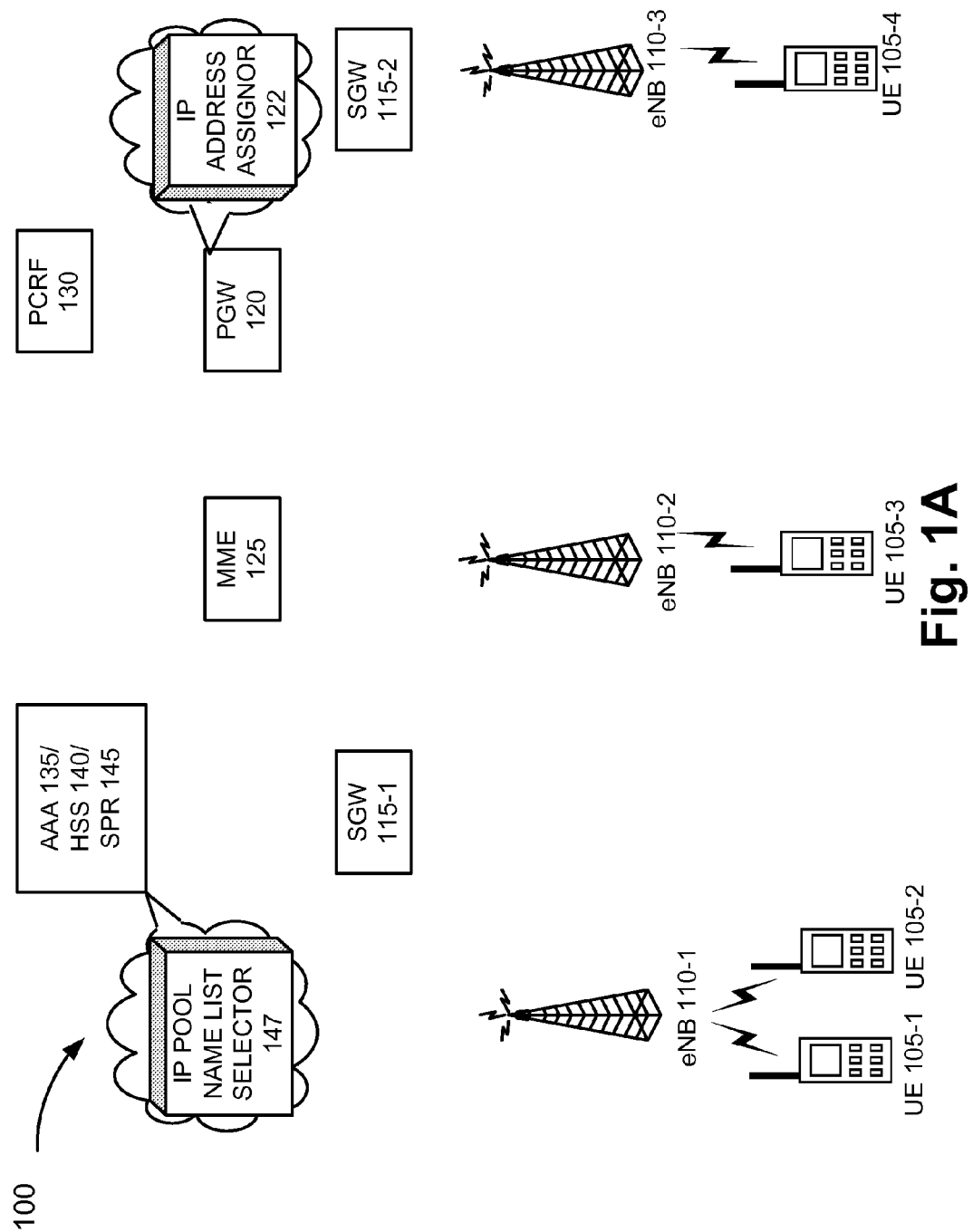

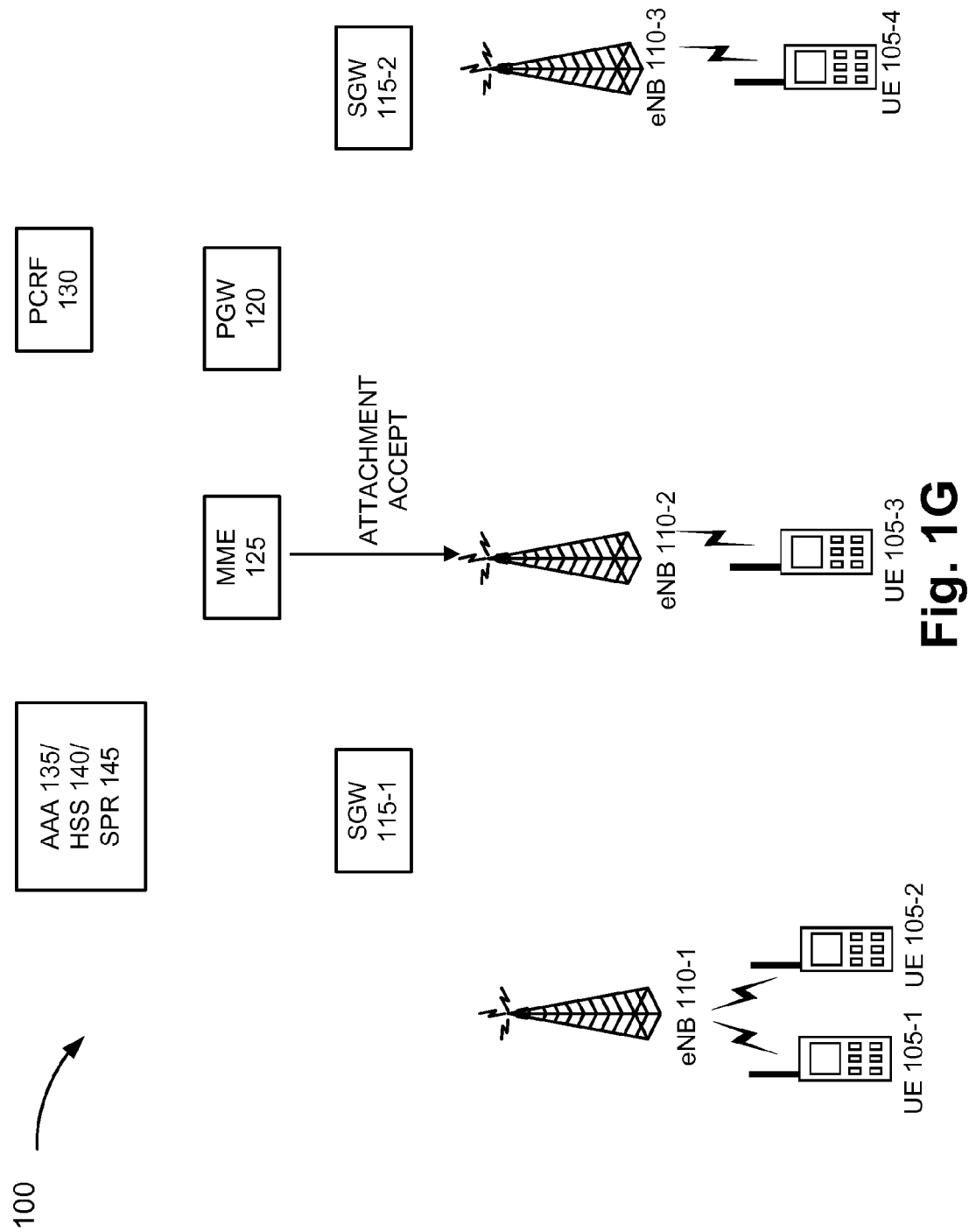

IP POOL NAME LISTS

BACKGROUND

When a user device attaches to a network, the user device is assigned a network address (e.g., an Internet Protocol (IP) address). The user device address assignment can involve either dynamic network addresses or static network addresses. Typically, for dynamic IP address assignment, an IP address is assigned to the user device from an IP address pool, and this IP address is used by the user device while the user device is attached to the network. When the user device detaches from the network, the IP address is returned to the IP address pool.

BRIEF DESCRIPTION OF THE DRAWINGS

FIG. 1A is a diagram illustrating an exemplary network in which an IP address pool name list may be implemented.

FIGS. 1B-1G are diagrams illustrating an exemplary process in which an IP address pool name list may be implemented;

DETAILED DESCRIPTION OF PREFERRED EMBODIMENTS

Figure 1B:
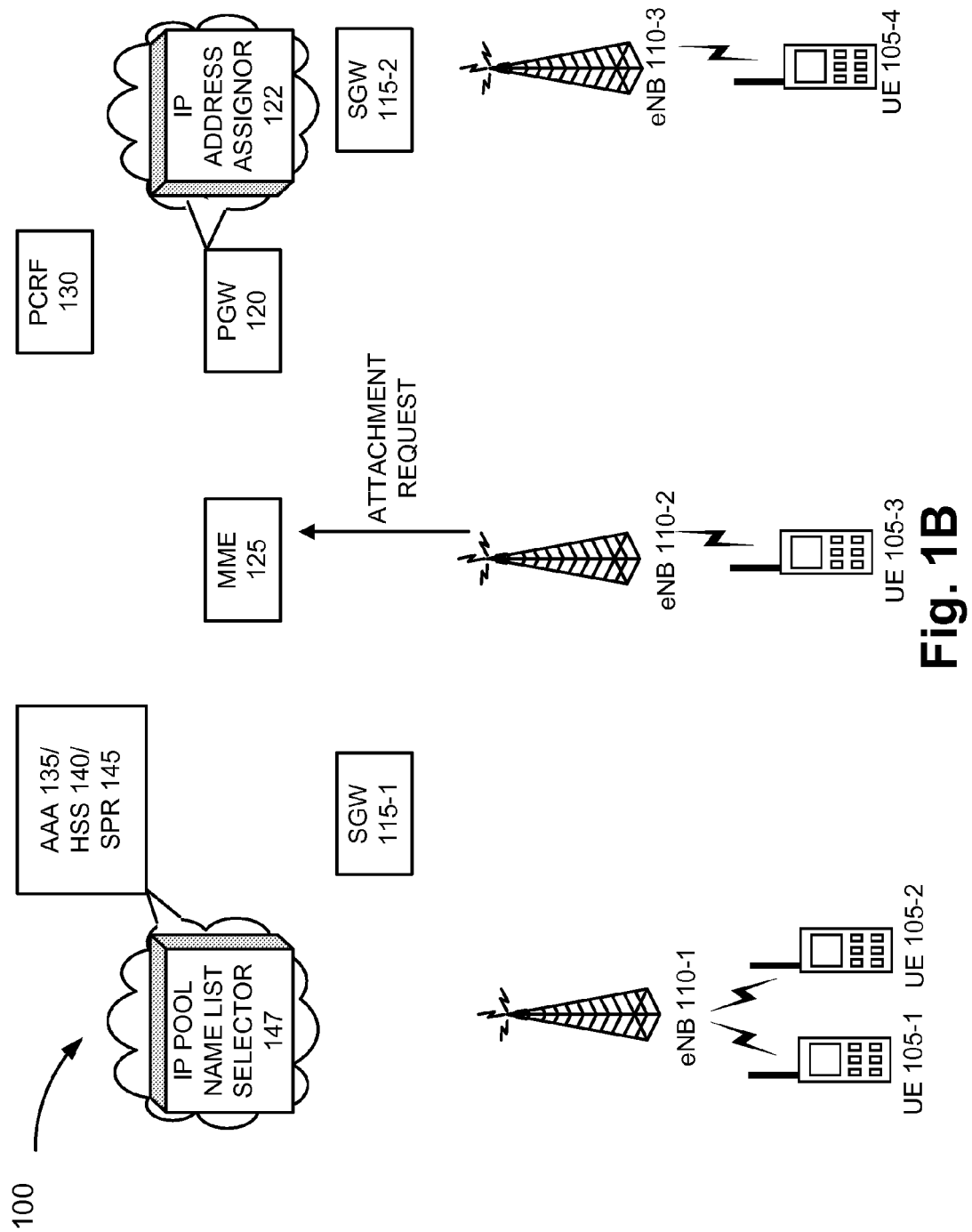

The following detailed description refers to the accompanying drawings. The same reference numbers in different drawings may identify the same or similar elements. Also, the following detailed description does not limit the invention.

With the advent of 4$^{th}$ Generation (4G) networks, such as, Long Term Evolution (LTE) or evolved High Rate Packet Data (e-HRPD), a network device, such as, for example, a Packet Date Network (PDN) Gateway (PGW), may take part in the assignment of an IP address to a user equipment (UE). For example, an Authentication, Authorization, and Accounting server (AAA) or a Home Subscriber Server (HSS) may indicate to the PGW available IP address pools from which the PGW may assign an IP address to the UE for a particular PDN connection. However, the PGW is unable to determine which IP address pool to use for an IP address assignment given the type of service to be provided to the UE and/or other characteristics associated with the connection, the user, the application, etc.

According to exemplary embodiments, network address pool name lists may be stored and used during network address assignments to UEs. According to an exemplary embodiment, the network address pool name lists may correspond to IP address pool name lists. For example, IPv4 address pool name lists and IPv6 address pool name lists may be stored and used for IP address assignments to UEs.

By way of example, a network device, such as the PGW, may use one or multiple IP address pool name lists to select one or multiple IP addresses to assign to a UE. For example, during a PDN connection procedure, a network device, such as, the AAA or the HSS may send lists of IP pool names to the PGW that can be used for that PDN connection. As an example, if an Internet PDN connection is being set-up, the AAA or the HSS may provide to the PGW an IPv4 address pool name list and an IPv6 address pool name list based on the service to be provided to the UE and/or other characteristics associated with the user, the connection, the application, etc. According to such an embodiment, the PGW may assign a dual-stack of IP addresses (i.e., an IPv4 address and an IPv6 address) to the UE, which may be selected from the IPv4 address pool name list and the IPv6 address pool name list.

According to an exemplary embodiment, the IP pool names in an IP address pool name list may be ordered to prioritize the selection process by the PGW. For example, if there are multiple IP pool names in the IP address pool name list, the PGW may select a higher order IP pool name to use for the IP address assignment before selecting a lower order IP pool names.

According to an exemplary embodiment, the names of the IP address pools may also indicate whether an IP address pool corresponds to an IPv4 address pool or an IPv6 address pool. Additionally, according to an exemplary embodiment, when the PGW cannot select an IP address pool name included in the IP address pool name list provided, the PGW may proceed with the IP address assignment based on network policies. For example, the PGW may reject the PDN connection request and/or not assign an IP address. Alternatively, the PGW may assign an IP address from a default IP address pool.

According to an exemplary embodiment, when the PGW communicates with the AAA/HSS to obtain the IP address pool name list, the AAA/HSS may identify which PGW of multiple PGWs (e.g., based on a globally unique PGW identifier; PGW network address, a location associated with the PGW, etc.) is associated with the PDN connection. The AAA/HSS may then create and/or select a list of IP pool names based on the identity and/or location of the PGW. For example, if the PGW is associated with a roaming carrier and used to support local breakout, the AAA/HSS may provide the roaming carrier's PGW with a special IP pool list that includes special IP pool names for special IP address assignment.

Additionally, as will be described further below, according to exemplary embodiments, modifications to existing interfaces between devices, new interfaces between devices, new messaging, modified messaging, etc., may be implemented to permit the provisioning and/or use of network address pool name lists.

FIG. 1A is a diagram illustrating an exemplary network 100 in which an IP address pool name list may be implemented. As illustrated in FIG. 1A, network 100 may include eNBs 110-1 through 110-3 (referred to generally as eNB 110 or eNBs 110), SGWs 115-1 through 115-2 (referred to generally as SGW 115 or SGWs 115), a PGW 120 that includes an IP address assignor 122, a mobility management entity (MME) 125, a policy and charging rules function (PCRF) device 130, and an AAA 135/HSS 140/Subscriber Policy Register (SPR) 145 (AAA 135/HSS 140/SPR 145) that includes an IP pool name list selector 147. According to an exemplary implementation of the LTE communication standard, SGW 115, PGW 120, and MME 125 may form an Evolved Packet Core (EPC) network. UEs 105-1 through 105-4 (referred to generally as UE 105 or UEs 105) may attach to network 100 for services, assets, etc.

The number of devices and configuration in network 100 is exemplary and provided for simplicity. In practice, network 100 may include additional devices, fewer devices, different devices, and/or differently arranged devices than those illustrated in FIG. 1A. For example, network 100 may include another type of gateway, a relay node, a home NB (HeNB), a femtocell, a picocell, a repeater, a radio node, etc. Additionally, or alternatively, network 100 may include additional networks and/or different networks than those illustrated in FIG. 1A. For example, network 100 may include public and/or private IP networks and/or other types of networks, resources, assets, services, Application Service Providers (ASPs), other operators that may host applications, etc. Also, according to other embodiments, functions described as being performed by a particular device in network 100 may be performed by a different device or a combination of devices.

Although FIG. 1A illustrates separate instances of MME 125, PGW 120, SGW 115, etc., according to other embodiments, two or more of these devices may be combined. For example, MME 125 may be combined with SGW 115, or PGW 120 may be combined with SGW 115, PCRF 130 may be combined with PGW 120, etc. Network 100 may include wired and/or wireless connections among the devices illustrated.

UE 105 may include a device having the capability to communicate with other devices, systems, networks, and/or the like. For example, UE 105 may include a wireless telephone, an IP telephone, a computer (e.g., a laptop, a palmtop, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, and/or vehicle-based device. According to an exemplary embodiment, UE 105 may operate according to one or more versions of the LTE communication standard and/or one or more versions of the e-HRPD communication standard. According to other embodiments, UE 105 may operate according to one or more other wireless and/or wired network standards.

ENB 110 may include a network device that operates according to one or more versions of the LTE communication standard. Additionally, according to other exemplary embodiments, eNB 110 may operate according to other wireless access technologies (e.g., radio access technologies, etc.) other than an LTE communication standard. For example, eNB 110 may operate according to HRPD, e-HRPD, Code Division Multiple Access (CDMA), CDMA 2000, etc.

SGW 115 may include a network device that operates according to one or more versions of the LTE communication standard. Additionally, according to other exemplary embodiments, SGW 115 may operate according to one or more communication standards other than the LTE communication standard.

PGW 120 and MME 125 may include network devices that operate according to one or more versions of the LTE communication standard. Additionally, according to other exemplary embodiments, PGW 120 and MME 125 may operate according to one or more communication standards other than an LTE communication standard.

According to an exemplary embodiment, PGW 120 may include IP address assignor 122. IP address assignor 122 may select IP addresses to assign to UEs 105 from IP address pool name lists. IP address assignor 122 will be described in greater detail below.

Also, as described further below, according to an exemplary embodiment, PGW 120 may include a new and/or a modified interface to communicate with another device (e.g., AAA 135) to obtain the IP address pool name list. Additionally, PGW 120 may use new and/or modified messaging to communicate with the other device to obtain the IP address pool name lists.

PCRF device 130 may include a network device that manages bandwidth, charging rates, and policies. AAA 135 may include a network device that provides authentication, authorization, and accounting services. HSS 140 may include a network device that provides subscriber data storage for subscription-related information (e.g., subscriber profiles, etc.). HSS 140 may also provide other services (e.g., authentication, authorization, etc.). SPR 145 may include a network device that provides subscriber data storage for various policies (e.g., security policies, blacklists, white lists, notification rules, subscriber policies, etc.) and/or subscription-related information (e.g., subscriber profiles, etc.).

According to an exemplary embodiment, HSS 140 may store an IP address pool name database that includes IP address pool name lists and/or IP address pool names. Additionally, according to an exemplary embodiment, HSS 140 may include IP pool name list selector 147. IP pool name list selector 147 may select IP pool name lists to be used to assign IP addresses to UEs 105. IP pool name list selector 147 will be described in greater detail below.

Also, as described further below, according to an exemplary embodiment, AAA 135 and HSS 140 may include a new and/or a modified interface to communicate with each other and another device (e.g., PGW 120) to provide the IP address pool name lists. Additionally, AAA 135 and HSS 140 may use new and/or modified messaging to communicate with each other and the other device to provide the IP address pool name list.

Figure 1C:
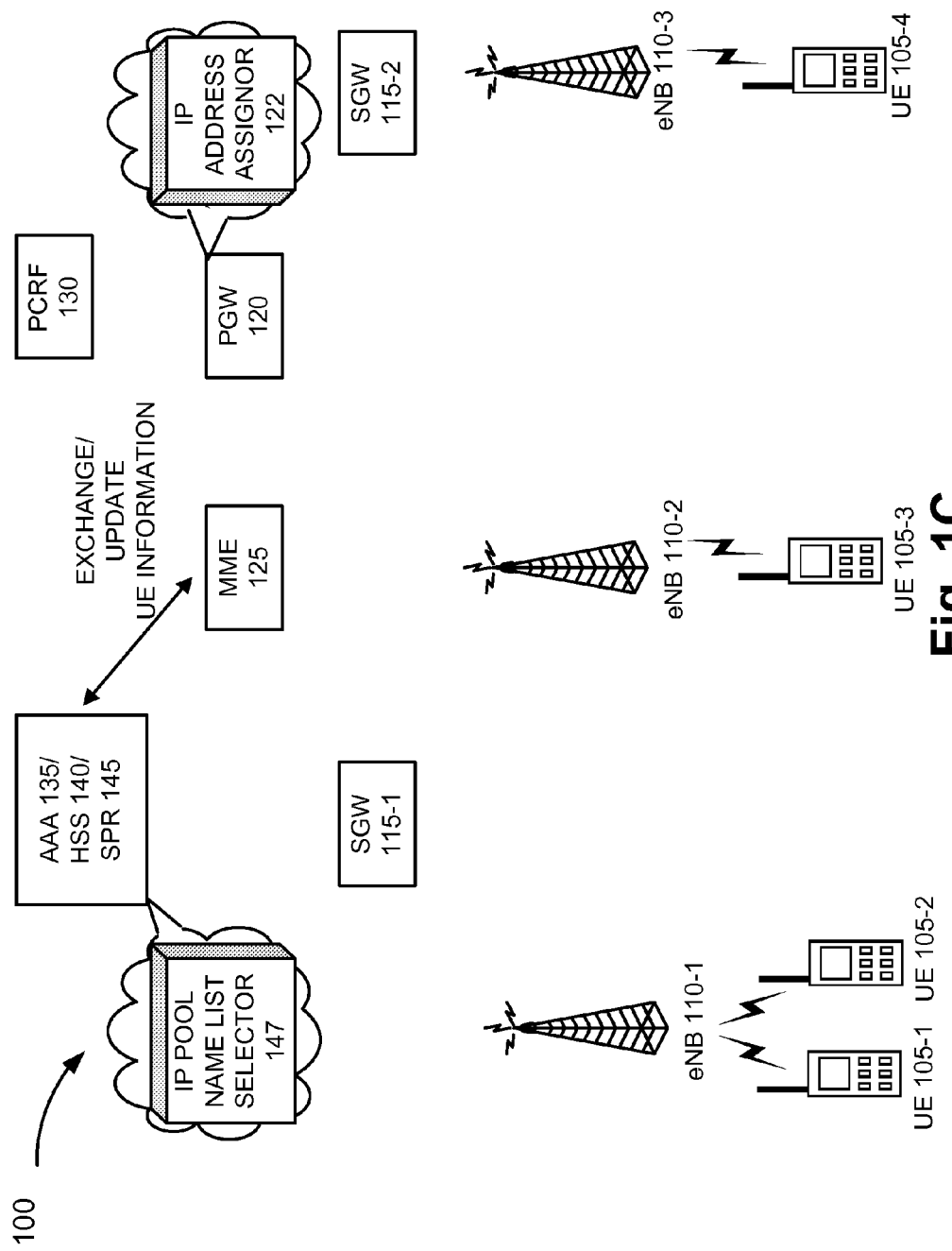
Figure 1D:
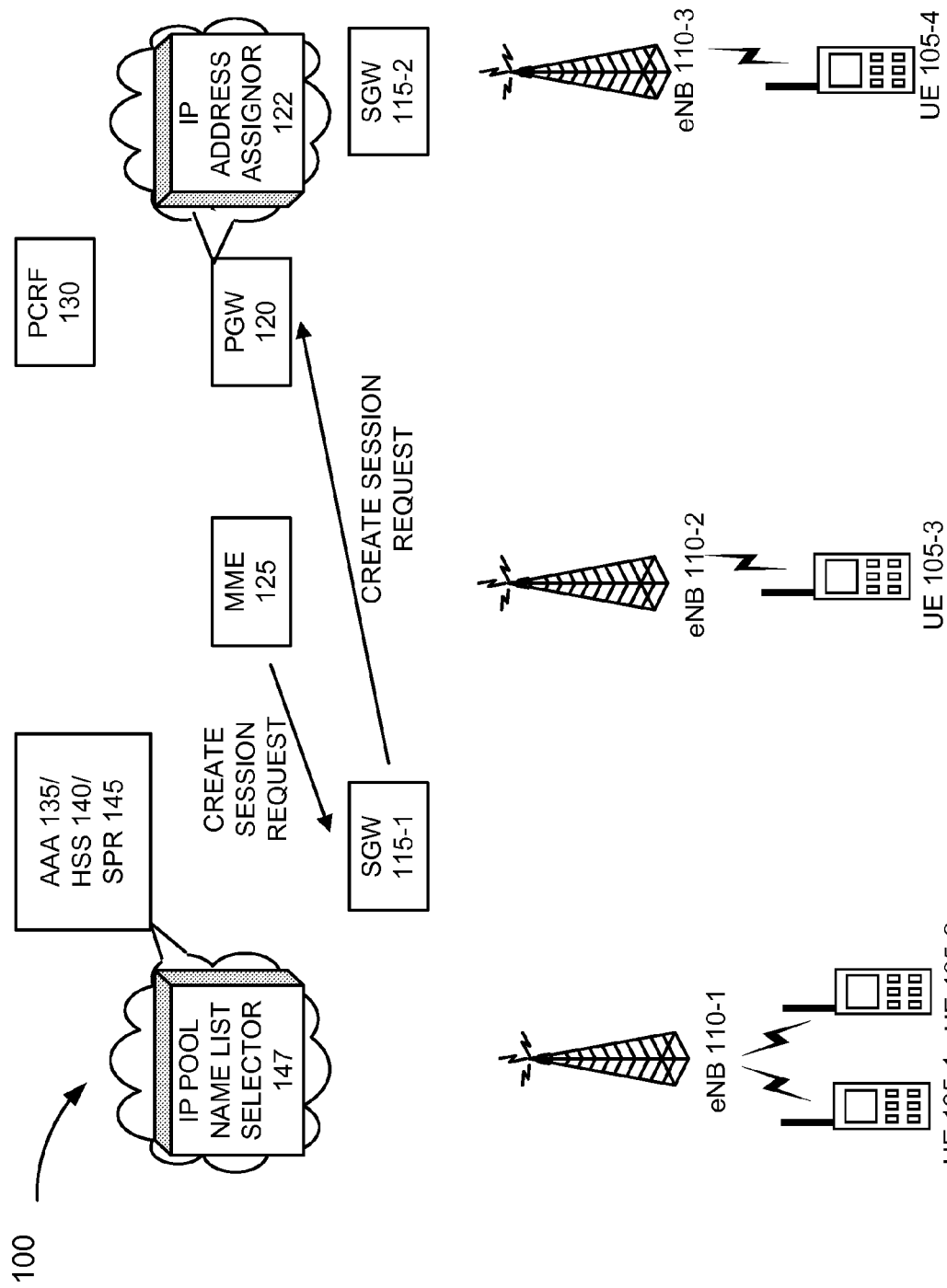

FIGS. 1B-1G are diagrams illustrating an exemplary process in which an IP address pool name list may be implemented. Referring to FIG. 1B, according to the exemplary process, it may be assumed that UE 105-3 and eNB 110-2 exchanged messages for a radio resource control (RRC) connection. As illustrated, eNB 110-2 may send an attachment request to MME 125. As illustrated in FIG. 1C, MME 125 and AAA 135/HSS 140/SPR 145 may exchange and/or update UE information. As the PDN connection process continues, as illustrated in FIG. 1D, MME 125 may send a create session request to SGW 115-1. When received, SGW 115-1 may send a create session request to PGW 120.

Figure 1E:
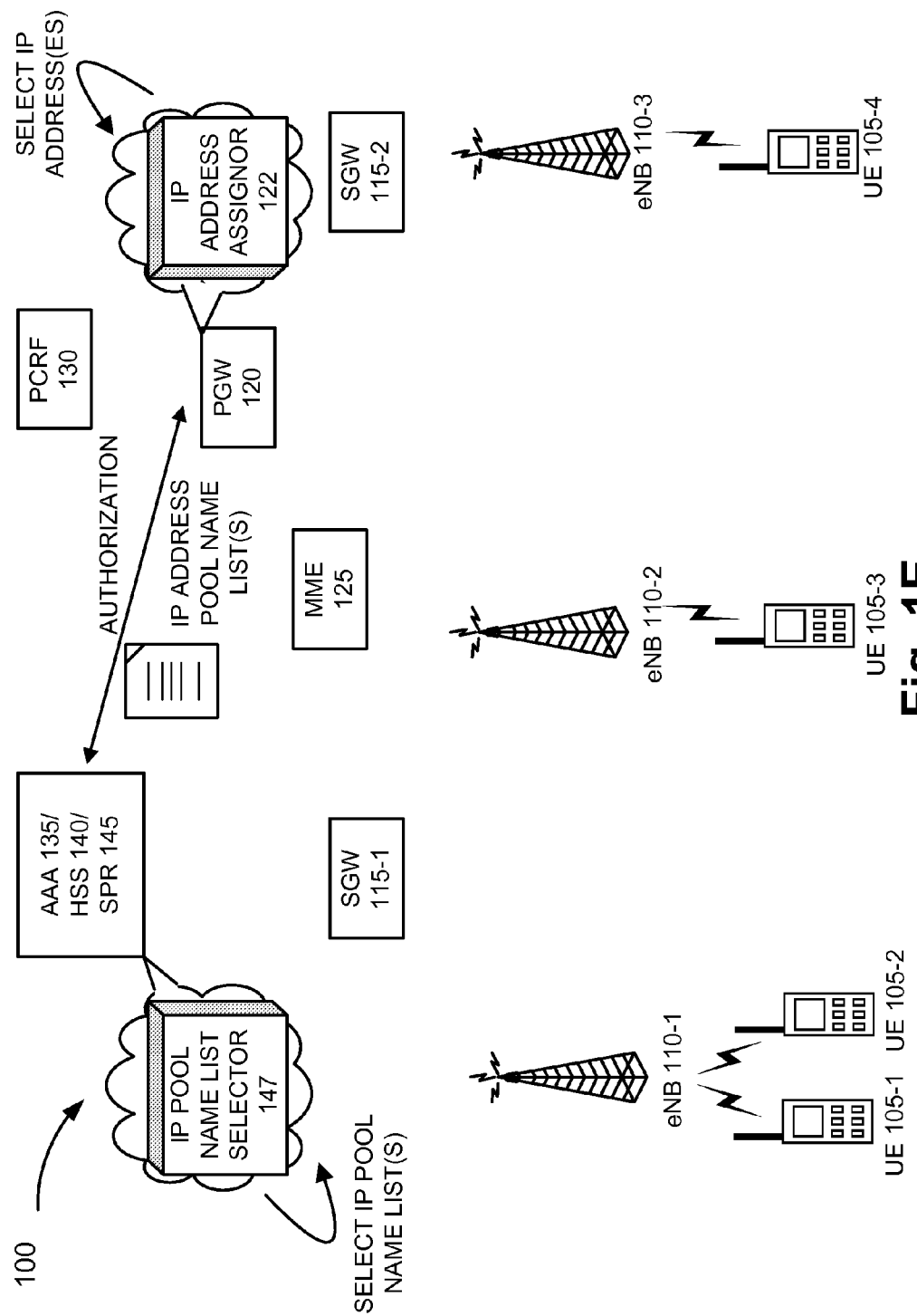

Referring to FIG. 1E, PGW 120 and AAA 135/HSS 140/SPR 145 may exchange messages regarding authorization. By way of example, PGW 120 may request authorization from AAA 135 regarding the PDN connection. AAA 135 may send a message to HSS 140 to obtain an IP pool name list. IP pool name list selector 147 of HSS 140 may select one or multiple IP pool name lists (e.g., from a database). Each IP pool name list may include a list of one or multiple IP pool names. According to an exemplary embodiment, IP pool name list selector 147 may select IP pool name list(s) based on a mapping between IP pool name lists and other information. For example, the other information may include access point names (APNs), user identifiers/UE 105 identifiers (e.g., Mobile Station Integrated Services Digital Network (MSISDN), International Mobile Subscriber Identity (IMSI), etc.), type of service, and/or application to be used with respect to the session request. HSS 140 may provide the selected IP pool name list(s) to AAA 135. As further illustrated, according to an exemplary embodiment, AAA 135/ HSS 140/SPR 145 may send the IP address pool name list(s) to PGW 120.

IP address assignor 122 of PGW 120 may select IP address (es) from the IP address pool name list(s) to be assigned to UE 105-3. According to an exemplary embodiment, PGW 120 may select IP address pool name(s) included in the IP address pool name list(s) that has/have a higher priority and/or higher order relative to other IP address pool names.

Figure 1F:
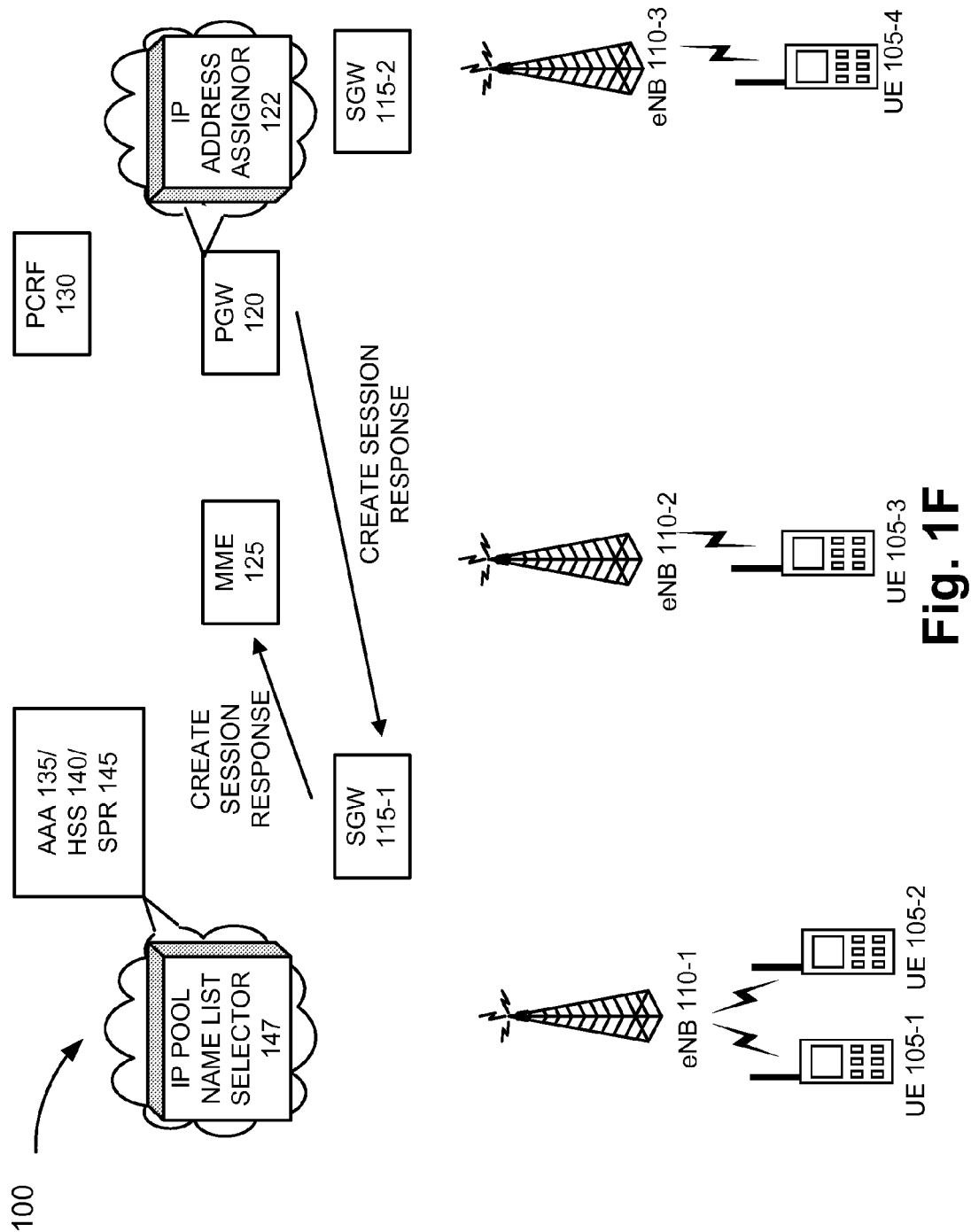

Referring to FIG. 1F, PGW 120 may send a create session response to SGW 115-1. The create session response may include the IP address(es) selected. When received by SGW 115-1, SGW 115-1 may send a create session response to MME 125. Thereafter, MME 125 may send an attachment accept to eNB 110-2, as illustrated in FIG. 1G.

Since an exemplary embodiment has been broadly described, a more detailed description is provided below. While the exemplary embodiment has been described with respect to PGW 120, AAA 135, and HSS 140 in an LTE communication network, according to other embodiments, devices different (e.g., a Home Location Register (HLR), an SPR, etc.) than PGW 120, AAA 135, and/or HSS 140 may be used to accomplish IP address assignment based on IP address pool name lists, as described herein.

Additionally, while the exemplary embodiment has been described with reference to the LTE communication standard and devices associated therewith, according to other exemplary embodiments, network 100 may correspond to a different type of network and may include different devices. By way of example, network address assignment based on network address pool name lists may be implemented in a Global System for Mobile Communications (GSM) network, a Universal Mobile Telecommunication System (UMTS) network, a Wideband Code Division Multiple Access (WCDMA) network, an Ultra Mobile Broadband (UMB) network, a Worldwide Interoperability for Microwave Access (WiMAX) network, an Institute of Electrical and Electronics Engineers (IEEE) 802.X network, a Evolution Data Optimized (EV-DO) network, and/or another type of wireless network.

According to such exemplary embodiments, devices in a network that may participate in the assignment of a network address to a UE (i.e., a user device) may perform processes analogous and/or similar to those described herein. By way of example, the GSM network may include an AAA device and/or an HLR to store network address pool name lists. According to such an embodiment, the AAA device and/or the HLR may perform processes analogous and/or similar to those described with respect to AAA 135 and HSS 140. Additionally, for example, in the GSM network, a Gateway General Packet Radio Service (GPRS) Support Node (GGSN) may select network addresses, which may be assigned to the UE, from network address pool name lists. According to such an embodiment, the GGSN may perform processes analogous and/or similar to those described with respect to PGW 120. Further, according to such exemplary embodiments, new and/or modified communication interfaces may be used, as well as new and/or modified messaging.

Figure 2:
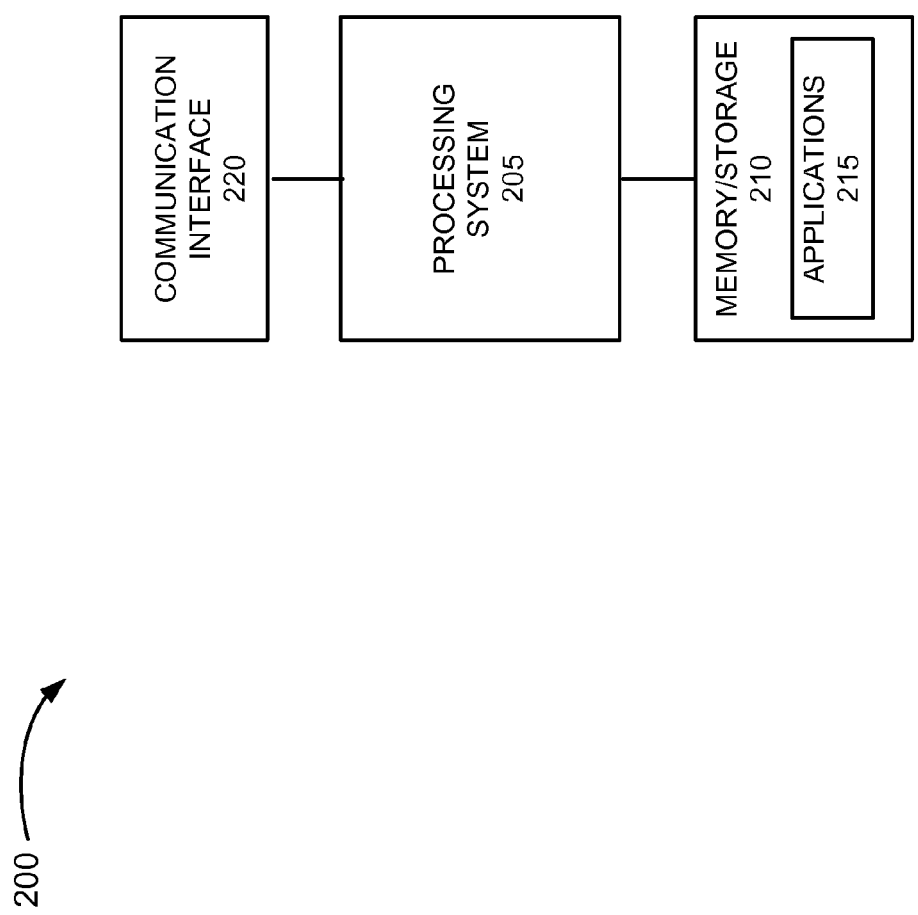
FIG. 2 is a diagram illustrating exemplary components of a device that may correspond to one or more of the devices in the exemplary network.

FIG. 2 is a diagram illustrating exemplary components of a device 200 that may correspond to one or more of the devices in network 100. For example, device 200 may correspond to PGW 120, SGW 115, eNB 110, as well as other devices (e.g., MME 125, UE 105, AAA 135, HSS 140, SPR 145, etc.), depicted in FIGS. 1A-1G. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 110 (e.g., another device, a network, etc.).

Memory/storage 210 may include one or multiple memories and/or one or multiple secondary storages. For example, memory/storage 210 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), or the like). Memory/storage 210 may include a hard disk (e.g., a magnetic disk, an optical disk, a magneto-optic disk, a solid state disk, etc.) or some other type medium, along with a corresponding drive. Memory/storage 210 may be external to and/or removable from device 200, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a CD, a DVD, or another type of tangible storage medium. Memory/storage 210 may store data, application(s), and/or instructions related to the operation of device 200.

Applications 215 may include software that provides various services or functions. For example, applications 215 may include applications that perform various network-related and/or communication related functions. According to an exemplary embodiment, with respect to AAA 135, HSS 140, and/or PGW 120, applications 215 may include one or multiple applications to implement the IP address assignment based on the IP address pool name lists described herein.

Communication interface 220 may permit device 200 to communicate with other devices, networks, systems and/or the like. Communication interface 220 may include one or multiple wireless interfaces and/or wired interfaces. Communication interface 220 may include one or multiple transmitters, receivers, and/or transceivers. Communication interface 220 may include interfaces according to one or multiple versions of the LTE communication standard and/or e-HRPD communication standard. According to an exemplary embodiment, with reference to AAA 135, HSS 140, and PGW 120, communication interface 220 may include a new interface and/or a modified interface with respect to the LTE communication standard. Alternatively, communication interface 220 may include a new interface and/or a modified interface with respect to communication standards other than LTE.

Device 200 may perform operations in response to processing system 205 executing software instructions stored memory/storage 210. For example, the software instructions may be read into memory/storage 210 from another memory/ storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

Figure 3A:
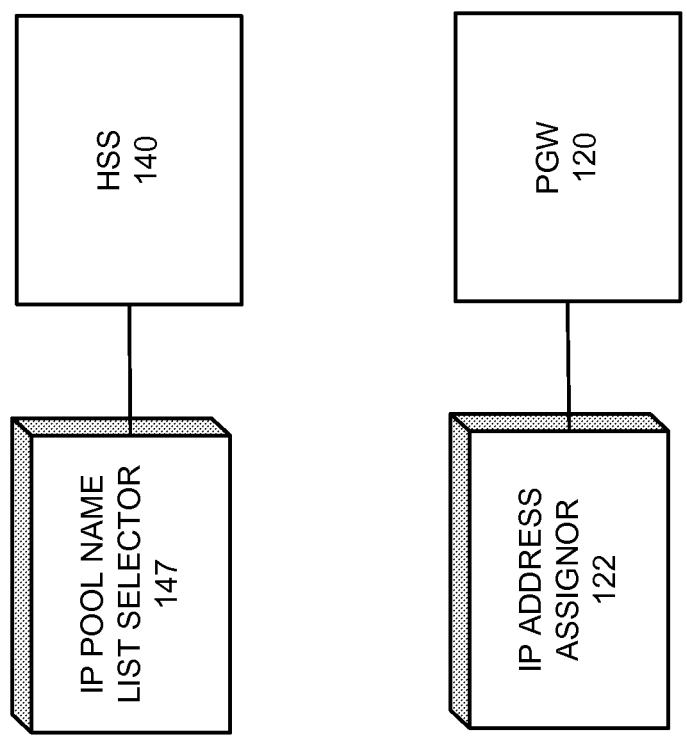
FIG. 3A is a diagram illustrating exemplary functional components associated with an exemplary embodiment for implementing IP address pool name lists.

As previously described, IP address pool name lists may be implemented to assist a network device to determine which IP address pool to use for IP address assignment. FIG. 3A is a diagram illustrating exemplary functional components associated with an exemplary embodiment for using IP address pool name lists. For example, as previously described, PGW 120 may include IP address assignor 122 and HSS 140 may include IP pool name list selector 147. IP address assigner 122 and IP pool name list selector 147 may be implemented as a combination of hardware (e.g., processing system 205, etc.) and software (e.g. applications 215, etc.) based on the components described with respect to FIG. 2. Alternatively, for example, IP address assigner 122 and IP pool name list selector 145 may be implemented as combination of hardware and firmware, or a combination of hardware, software, and firmware.

Although FIG. 3A illustrates exemplary functional components, according to other implementations, additional functional components, different functional components, and/or a different arrangement of functional components than those illustrated in FIG. 3A and described may be implemented. For example, IP address assignor 122 and/or IP pool name list selector 147 may be divided into two or more functional components.

Figure 3B:
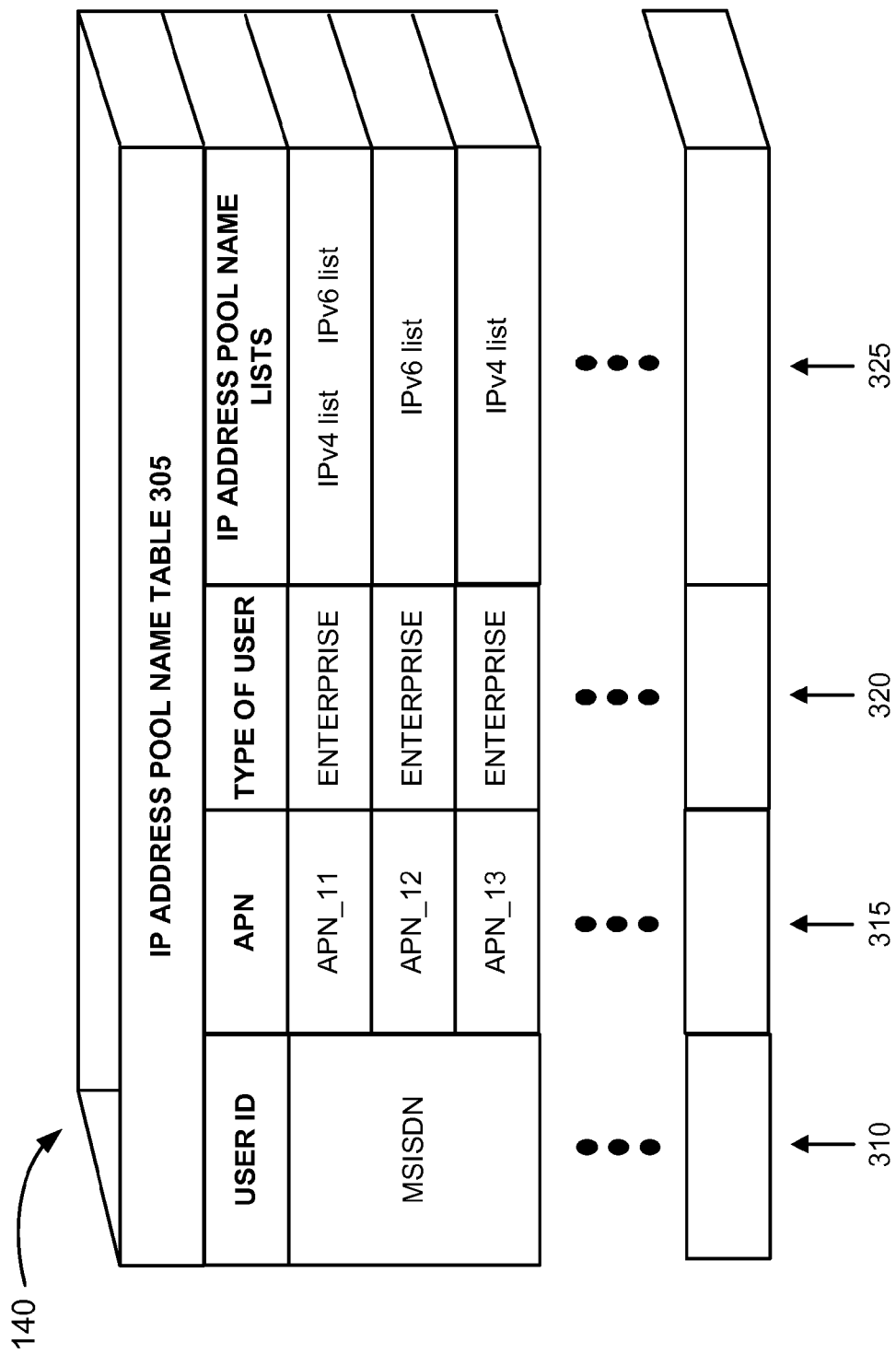
FIG. 3B is a diagram illustrating an exemplary IP address pool name table.

IP pool name list selector 147 may select one or multiple IP pool name lists. According to an exemplary embodiment, IP pool name list selector 147 may access a database to select the one or multiple IP pool name lists. The database may include IPv4 pool name lists and IPv6 pool name lists. For example, referring to FIG. 3B, an exemplary IP address pool name table 305 may include a user identification (ID) field 310, an APN field 315, a type of user field 320, and an IP address pool name lists field 325. According to other implementations, IP address pool name table 305 may include additional informational fields, fewer informational fields, and/or different informational fields than those illustrated in FIG. 3B and described herein. For example, according to other embodiments, IP address pool name table 305 may include other types of fields that include information corresponding to characteristics associated with a type of service, an application being used, a type of user, a quality of service, a type of connection, etc. According to such other embodiments, IP pool name lists may be mapped to additional, fewer, and/or different informational fields. Additionally, according to other embodiments, the information included in IP address pool name table 305 may be stored in a data structure other than a table.

User ID field 310 may include an identifier associated with UE 105 and/or the user. For example, user ID field 310 may include an MSISDN, an IMSI, a user identifier (e.g., a subscriber ID), or the like.

APN field 315 may define the type of service requested by the user. By way of example, some PDN connections may be afforded security measures. For example, UE 105 may be assigned an IP address that is protected by a network-based firewall in which unsolicited traffic may be prevented. According to another example, some PDN connections may afford unrestricted access to UE 105. According to yet another example, APN field 315 may include the type of application to be used by the user/UE 105.

Type of user field 320 may identify the type of user. For example, users may be categorized as an enterprise user, a consumer user, and/or some other type of categorization.

IP address pool name lists field 325 may include lists of IP address pool names. As previously described, IP address pool name lists field 325 may include IPv4 pool name lists and/or IPv6 pool name lists.

As illustrated, according to an exemplary implementation, IP address pool name table 305 may map IP address pool name lists to other informational fields, such as, for example, user ID field 310, APN field 315, and type of user field 320. An IP address pool name list may include one or multiple IP pool names. Further, according to an exemplary embodiment, an IP pool name list that includes multiple IP pool names may be arranged in a priority order. For example, the priority order may be based on a type of service associated with the IP pool name vis-à-vis a type of service requested by UE 105, the type of user, the application, and/or some other characteristic (e.g., quality of service (QoS), etc.). Additionally, according to an exemplary embodiment, the names of the IP address pools may indicate whether the IP address pool corresponds to an IPv4 address pool or an IPv6 address pool.

According to an exemplary process, when a PDN connection is requested by UE 105, IP pool name list selector 147 may select IP address pool name list(s) based on receiving information corresponding to user ID field 310, etc. For example, referring to FIG. 3C, AAA 135 may send an IP address pool name list request to HSS 140 over a modified SWx interface (SWx+). The IP address pool name list(s) request may include information (e.g., user ID field 310 information, APN field 315 information, etc.) to permit IP pool name list selector 147 to select IP pool name list(s) from IP address pool name table 305. The selected IP address pool name list(s) may include IP address pool names. According to an exemplary embodiment, the IP address pool names may be prioritized based on the mapping information. By way of example, an IP address pool name list may include IP address pool names having different levels of priority based on the type of service, the type of user, and/or the type of application. According to such an embodiment, the priority order of the IP address pool names included in the IP address pool name list may permit PGW 120 to select an appropriate IP address from an appropriate IP address pool name list. As previously described, in some instances, IP pool name list selector 147 may select an IPv4 pool name list and an IPv6 pool name list. According to such an embodiment, PGW 120 may select an appropriate dual-stack of IP addresses.

Figure 3C:
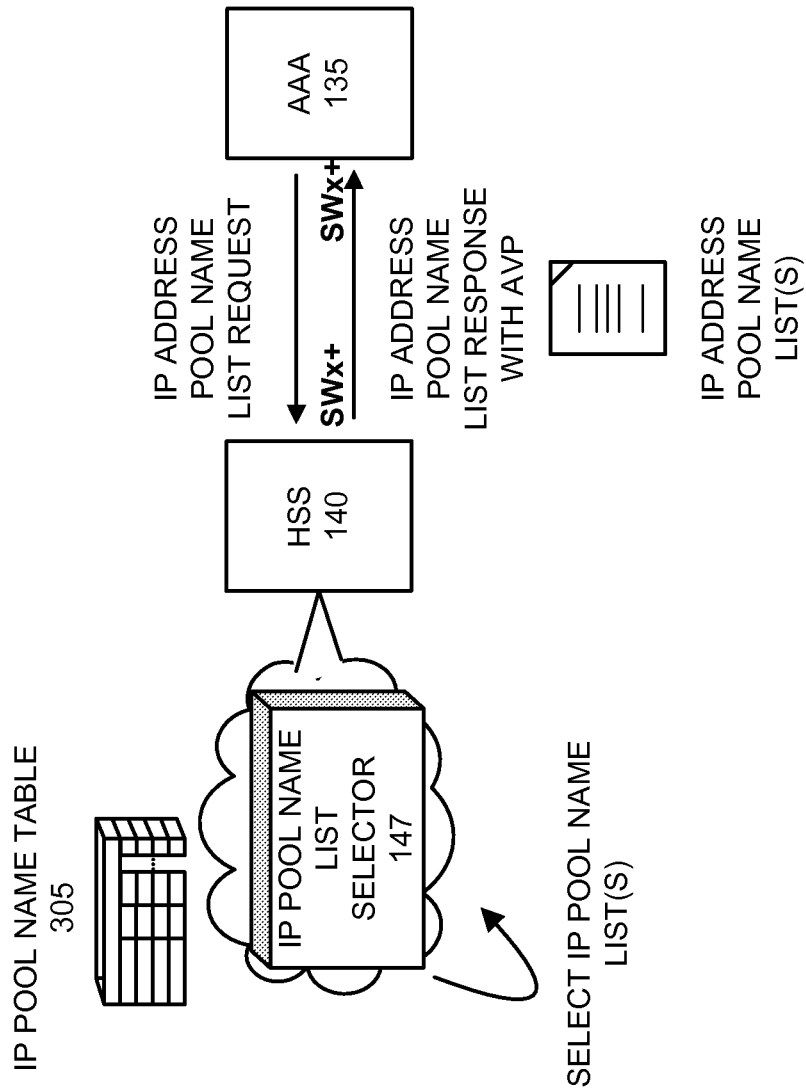
FIG. 3C is a diagram illustrating an exemplary process associated with an IP pool name list selector.

As further illustrated in FIG. 3C, HSS 140 may send an IP address pool name list response that includes one or multiple attribute value pairs (AVPs) over an SWx+ interface. The AVP(s) may include the selected IP address pool name list(s).

Referring back to FIG. 3A, IP address assignor 122 may select one or multiple IP addresses from the IP address pool name list(s). According to an exemplary embodiment, when IP address assignor 122 receives an IPv4 pool name list and an IPv6 pool name list, IP address assignor 122 may select an IPv4 address from the IPv4 pool name list and an IPv6 address from the IPv6 pool name list. According to this embodiment, PGW 120 may assign both IP addresses to UE 105. According to other exemplary embodiments, IP address assignor 122 may receive an IPv4 pool name list or an IPv6 pool name list and may select an IP address (i.e., an IPv4 address or an IPv6 address) from the IP address pool name list received.

According to an exemplary embodiment, the IP address assignor 122 may select an IP address pool name from the IP address pool name list based on a priority associated with the IP address pool names included in the IP address pool name list. Once the IP address assignor 122 selects an appropriate IP pool name, IP address assignor 122 may select an IP address (e.g., a static IP address, a dynamic IP address, etc.) associated with the IP pool name. As previously described, in instances when IP address assignor 122 is unable to select an IP pool name (e.g., HSS 140 does not provide an IP address pool name list) or the IP pool name does not have available IP address, IP address selector 122 may select from a default IP address pool. Alternatively, PGW 120 may reject the PDN connection request or follow some other type of network policy.

Figure 3D:
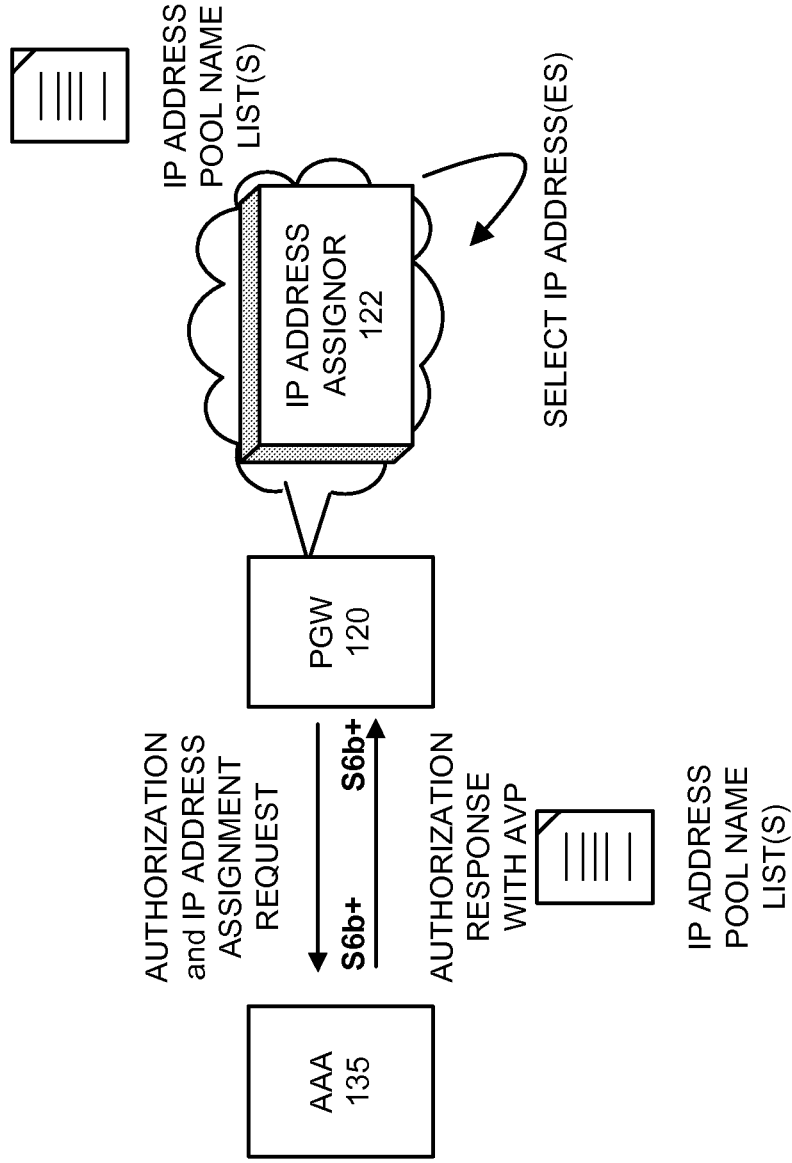
FIG. 3D is a diagram illustrating an exemplary process associated with an IP address assignor.

According to an exemplary process, as illustrated in FIG. 3D, PGW 120 may send an authorization and IP address assignment request to AAA 135. As previously described with reference to FIG. 3C, AAA 135 may obtain IP address pool name list(s) from HSS 140. Referring back to FIG. 3D, AAA 135 may send an authorization response with one or multiple AVPs to include the IP address pool name list(s) to PGW 120 over a modified S6b interface (S6b+). As further illustrated in FIG. 3D, when PGW 120 receives the IP address pool name list(s), IP address assignor 122 may select IP address pool name(s) from the IP address pool name list(s). IP address assignor 122 may then select IP address(es) from the selected IP address pool name(s).

The exemplary processes for providing and using IP address pool name lists when establishing a PDN connection and assigning an IP address, as described herein, are not exhaustive and other implementations not specifically described and/or illustrated may be used. For example, different devices, different messages, and/or different interfaces may be used to provide and use IP address pool name lists. By way of example, according to an exemplary embodiment, new interfaces may be implemented instead of modifying existing interfaces associated with the communication standard. Additionally, new messages may be used instead of modifying messages (e.g., using AVP(s)) to carry the IP address pool name lists.

Figure 4:
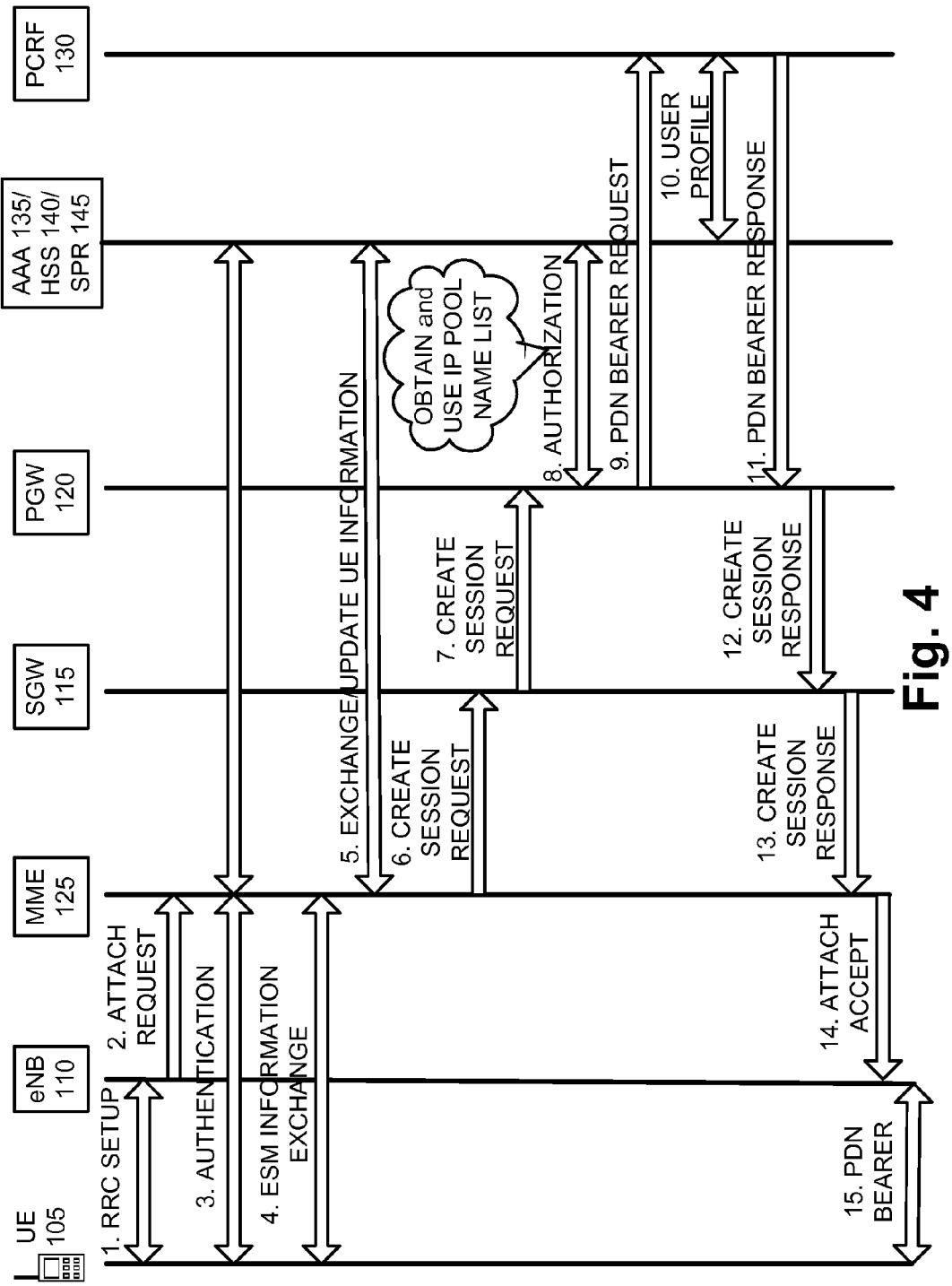
FIG. 4 is a diagram illustrating an exemplary connection flow in which an IP address pool name list may be implemented.

FIG. 4 is a diagram illustrating an exemplary connection flow in which an IP address pool name list may be implemented. According to other implementations, the connection flow may be different and involve communication between different devices, include different messages, involve a different order in which messages are communicated, and/or the like.

As illustrated in FIG. 4, UE 105 and eNB 110 may communicate to establish a radio resource connection (RRC). ENB 110 may send an attachment request to MME 125 and after an RRC connection is established, an authentication procedure may begin. For example, UE 105 may send an authentication request that is received by MME 125. MME 125 may communicate with AAA 135/HSS 140/SPR 145 and provide an authentication response to UE 105. As further illustrated, MME 125 may then send an Evolved Packet System (EPS) Session Management (ESM) information request to UE 105 and UE 105 may send an ESM information response to MME 125. MME 125 and HSS 140 may exchange and/or update UE information.

Following the UE information exchange and/or update, MME 125 may send a create session request that may propagate to PGW 120 via SGW 115. As previously described, according to an exemplary embodiment, and with reference to communication no. (8), PGW 120 and AAA 135 may communicate in relation to authorization, subscription-related parameters, as well as IP address pool name lists. PGW 120 may obtain one or multiple IP pool name lists and may select one or multiple IP addresses to assign to UE 105.

As further illustrated in FIG. 4, PGW 120 may send a PDN bearer request to PCRF 130 and PCRF 130 may obtain user profile information from AAA 135/HSS 140/SPR 145. PGW 120 may receive a PDN bearer response from PCRF 130. PGW 120 may send a create session response to MME 125 via SGW 115, and an attachment accept may be sent from MME 125 to eNB 110.

ENB 110 and UE 105 may establish a PDN bearer connection and UE 105 may be assigned the IP address(es) selected by PGW 120 based on the IP address pool name list(s).

Figure 5:
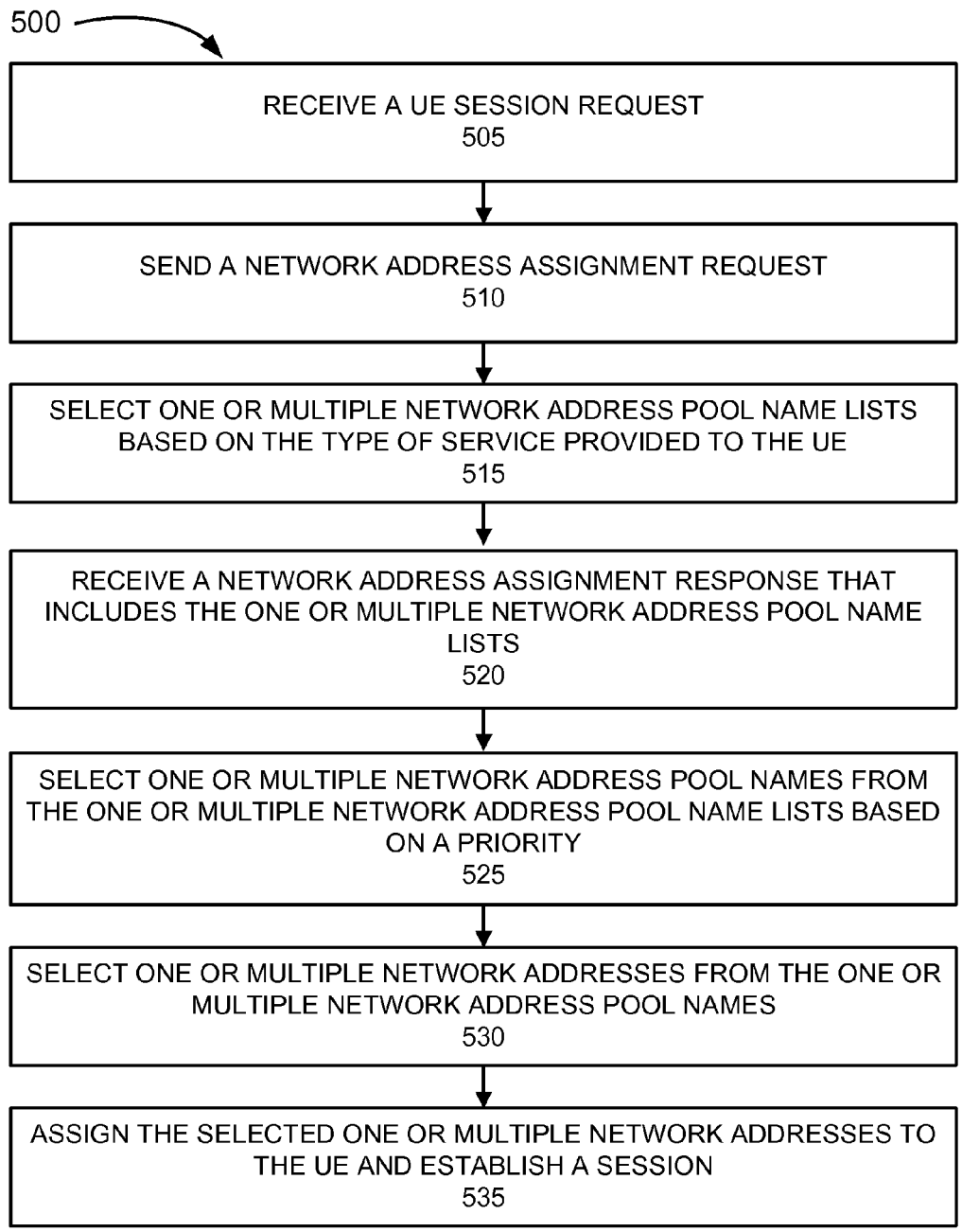
FIG. 5 is a diagram illustrating an exemplary process in which an IP address pool name list may be implemented.

FIG. 5 is a diagram illustrating an exemplary process 500 in which network address pool name list(s) may be implemented for network address assignment. According to an exemplary embodiment, network address assignment may include the assignment of IP addresses. However, according to other embodiments, network address assignment may include the assignment of other types of network addresses. Additionally, although process 500 is described in relation to devices associated with an LTE network, according to other embodiments, process 500 may performed by devices associated with a different type of network.

Process 500 may include receiving a UE session request (block 505). For example, as previously described, PGW 120 may receive a session request associated with UE 105.

A network address assignment request may be sent (block 510). For example, as previously described, PGW 120 may send to AAA 135 an IP address assignment request.

One or multiple network address pool name lists may be selected based on the type of service provided to the UE (block 515). For example, as previously described, AAA 135 may send an IP address pool name list request to HSS 140. IP pool name list selector 147 of HSS 140 may select one or multiple IP address pool name lists from IP address pool name table 305. According to an exemplary embodiment, IP pool name list selector 147 may select the one or multiple IP address pool name lists based on the type of service provided to UE 105. According to other exemplary embodiments, IP pool name list selector 147 may select the one or multiple IP address pool name lists based on other criterion or criteria, such as, for example, the type of user, the type of application, etc. According to an exemplary implementation, the name of the IP address pools and/or some other indicator associated with the IP address pool name, may indicate whether the IP address pool includes IPv4 addresses or IPv6 addresses.

A network address assignment response that includes the one or multiple network address pool name lists may be received (block 520). For example, as previously described, HSS 140 may send an IP address assignment response that includes the one or multiple IP address pool name lists to AAA 135. According to an exemplary implementation, the one or multiple IP address pool name lists may be sent as one or multiple AVPs over modified interfaces (e.g., SWx+). According to another implementation, the one or multiple IP address pool name lists may be sent over new interfaces. Additionally, as previously described, AAA 135 may send an IP address assignment response that includes the one or multiple IP address pool name lists to PGW 120. According to an exemplary implementation, the one or multiple IP address pool name lists may be sent to PGW 120 as one or multiple AVPs over a modified interface (S6b+). According to another implementation, the one or multiple network address pool name lists may be sent to PGW 120 over a new interface.

One or multiple network address pool names may be selected from the one or multiple network address pool name lists based on a priority (block 525). For example, as previously described, IP address assignor 122 of PGW 120 may select one or multiple IP address pool names from the one or multiple IP address pool name lists. According to an exemplary embodiment, IP address assignor 122 may select the one or multiple IP address pool names based on a priority associated with the IP address pool names.

One or multiple network addresses may be selected from the one or multiple network address pool names (block 530). For example, as previously described, IP address assignor 122 of PGW 120 may select one or multiple IP addresses from the one or multiple IP address pools. The IP addresses may correspond to an IPv4 address and/or an IPv6 address. The IP addresses may be static or dynamic.

The selected one or multiple network addresses may be assigned to the UE and a session may be established (block 535). For example, as previously described, UE 105 may be assigned the one or multiple IP addresses and a session may be established.

Although FIG. 5 illustrates an exemplary process 500 for implementing IP address pool name lists, according to other embodiments, process 500 may include additional operations, fewer operations, and/or different operations than those illustrated in FIG. 5 and described. By way of example, as previously described, IP address assignment may be selected from a default IP address pool when no IP pool names/IP addresses are available. Alternatively, the session may be rejected. Additionally, as previously described, the selection of the IP address pool name list and/or the IP pool names may be based on the identity and/or location of PGW 120. By way of example, a PGW associated with a roaming carrier may be provided with special IP pool names for IP address assignment.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified in other implementations. Further, non-dependent blocks may be performed in parallel. Additionally, with respect to other processes described in this description, the order of operations may be different according to other implementations, and/or operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, a combination of hardware, software, and firmware, a combination of hardware and firmware, or software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
receiving a session request associated with a user equipment (UE);
selecting one or more network address pool name lists that include a plurality of network address pool names, wherein each network address pool name, of the plurality of network address pool names, is associated with a priority, and wherein the priority of each network address pool name is based on a type of service requested by the session request and an application to be used with respect to the session request;
selecting one or more network address pool names from the plurality of network address pool names based on the priority associated with the one or more network address pool names;
selecting one or more network addresses from the one or more network address pool names;
assigning the one or more network addresses to the UE; and
establishing a session with the UE using the assigned one or more network addresses.

2. The method of claim 1, wherein the selecting of the one or more network address pool name lists comprises:
accessing a database that maps the one or more network address pool name lists to an access point name.

3. The method of claim 1, wherein the selecting of the one or more network address pool name lists comprises:
accessing a database that maps the one or more network address pool name lists to at least one of a UE identifier or a user identifier.

4. The method of claim 1, further comprising:
sending a message having one or more attribute value pairs that include the one or more network address pool name lists, wherein a modified interface relative to a communication standard is used for sending the message.

5. The method of claim 1, wherein the method is performed in a Long Term Evolution network.

6. The method of claim 5, wherein the selecting of the one or more network address pool names from the one or more network address pool name lists is performed by a packet data network gateway (PGW).

7. The method of claim 6, further comprising:
identifying the PGW; and
wherein the selecting the one or more network address pool name lists comprises:
selecting the one or more network address pool name lists based on an identity of the PGW.

8. The method of claim 1, wherein when the one or more network addresses includes multiple network addresses, the multiple network addresses include an Internet Protocol (IP) version 4 address and an IP version 6 address.

9. The method of claim 1, wherein the type of service requested by the session request includes unrestricted access or restricted access.

10. The method of claim 1, further comprising:
selecting from a default network address pool when another network address associated with the one or more network address pool name lists is not available.

11. A network device comprising:
a processor configured to:
receive a create session request associated with a user equipment;
send a request for a network address pool name list;
receive one or more network address pool name lists, wherein each network address pool name list includes a plurality of network address pool names, wherein each network address pool name, of the plurality of network address pool names, is associated with a level of priority, and wherein the level of priority of each address pool name is based on a type of service associated with the create session request and an application to be used with respect to the create session request;
select one or more network address pool names from the plurality of network address pool names based on the levels of priority associated with the one or more network address pool names;
select one or more network addresses from the one or more network address pool names; and
assign the one or more network addresses to the user equipment.

12. The network device of claim 11, wherein the network device includes a packet data network gateway (PGW).

13. The network device of claim 11, wherein the network device receives the one or more network address pool name lists over a modified S6b interface.

14. The network device of claim 11, wherein the type of service associated with the create session request includes unrestricted access or restricted access.

15. The network device of claim 11, wherein when the one or more network addresses includes multiple network addresses, the multiple network addresses include an Internet Protocol (IP) version 4 address and an IP version 6 address.

16. The network device of claim 11, wherein the processor is further configured to:
select from a default network address pool when another network address associated with the one or more network address pool name lists is not available.

17. A non-transitory computer-readable medium containing instructions, the instruction comprising:
one or more instructions that, when executed by one or more processors, cause the one or more processors to:
receive a create session request associated with a user equipment;
send a request for a network address pool name list;
receive one or more network address pool name lists, wherein each network address pool name list includes a plurality of network address pool names, wherein each network address pool name, of the plurality of network address pool names, is associated with a level of priority, and wherein the level of priority of each address pool name is based on a type of service associated with the create session request and an application to be used with respect to the create session request;
select one or more network address pool names from the plurality of network address pool names based on the levels of priority associated with the one or more network address pool names;
select one or more network addresses from the one or more network address pool names; and
assign the one or more network addresses to the user equipment.

18. The computer-readable medium of claim 17, wherein when the one or more network addresses includes multiple network addresses, the multiple network addresses include an Internet Protocol (IP) version 4 address and an IP version 6 address.

19. The computer-readable medium of claim 17, wherein the instructions further comprise one or more instructions that cause the one or more processors to select from a default network address pool when another network address associated with the one or more network address pool name lists is not available.

20. The computer-readable medium of claim 17, wherein the type of service associated with the create session request includes unrestricted access or restricted access.

* * * * *